United States Patent [19]
Bora

[11] Patent Number: 5,722,144
[45] Date of Patent: Mar. 3, 1998

[54] DEVICE AND PROCESS FOR REPAIRING AND CONNECTING VEHICLE BODY ELEMENTS OF A LIGHT ALLOY

[75] Inventor: Viorel Bora, Untereisesheim, Germany

[73] Assignee: Audi AG, Ingolstadt, Germany

[21] Appl. No.: 557,194

[22] PCT Filed: Jun. 16, 1994

[86] PCT No.: PCT/EP94/01955

§ 371 Date: Dec. 4, 1995

§ 102(e) Date: Dec. 4, 1995

[87] PCT Pub. No.: WO95/00269

PCT Pub. Date: Jan. 5, 1995

[30] Foreign Application Priority Data

Jun. 17, 1993 [DE] Germany ............... 43 20 068.0

[51] Int. Cl.$^6$ .................................................. B23P 6/00
[52] U.S. Cl. .................. 29/402.05; 29/402.08; 29/525.06; 29/254
[58] Field of Search ............ 29/402.03, 402.05, 29/402.06, 402.08, 525.06, 243.53, 243.54, 254, 255

[56] References Cited

U.S. PATENT DOCUMENTS

| | | | |
|---|---|---|---|
| 4,365,401 | 12/1982 | Ogren | 29/243.53 |
| 4,635,437 | 1/1987 | Parton | 29/522.1 |
| 4,918,798 | 4/1990 | Reed | 29/243.53 |
| 4,949,446 | 8/1990 | Kuwica | 29/243.53 |
| 5,042,129 | 8/1991 | Seccombe | 29/243.53 |
| 5,140,736 | 8/1992 | Hsiao | 29/243.54 |

FOREIGN PATENT DOCUMENTS

| | | |
|---|---|---|
| 664199 | 8/1929 | France . |
| 782335 | 6/1935 | France . |
| 3323318 | 1/1985 | Germany . |
| 57311 | 7/1944 | Netherlands . |

Primary Examiner—David P. Bryant
Attorney, Agent, or Firm—Lalos & Keegan

[57] ABSTRACT

A process and device are disclosed for connecting stacked vehicle body elements of a light alloy using stamped rivets. Using the disclosed process and device, damaged vehicular body elements may be easily removed and replaced. A first body element and damaged second body element attached thereto by means of stamped rivets are separated and the damaged second body element replaced by a third body element. Process steps include forcing out an old stamped rivet, restoring a stamped rivet area on a first body element, placing a third body element in position, and punching and riveting the third body element and the first body element. A device related to the disclosed process includes pneumatically compressible tong arms for holding tool inserts. A variety of tool inserts are adapted for forcing out an old rivet, restoring stamped area in the first body element and punching hole and stamping a countersink in the third body element. The disclosed process and device simplify the repair of vehicular body damage by providing means to remove damaged elements and attach new elements without generating steel shavings and the associated risk of contact corrosion.

11 Claims, 3 Drawing Sheets

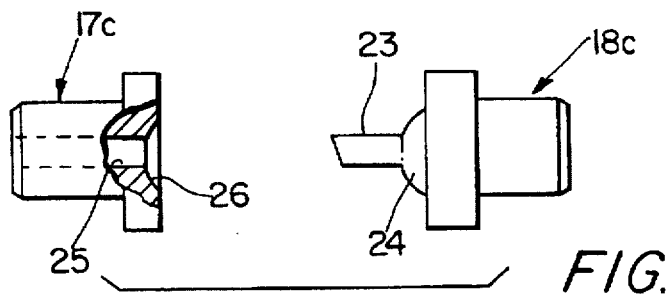
FIG. 10a
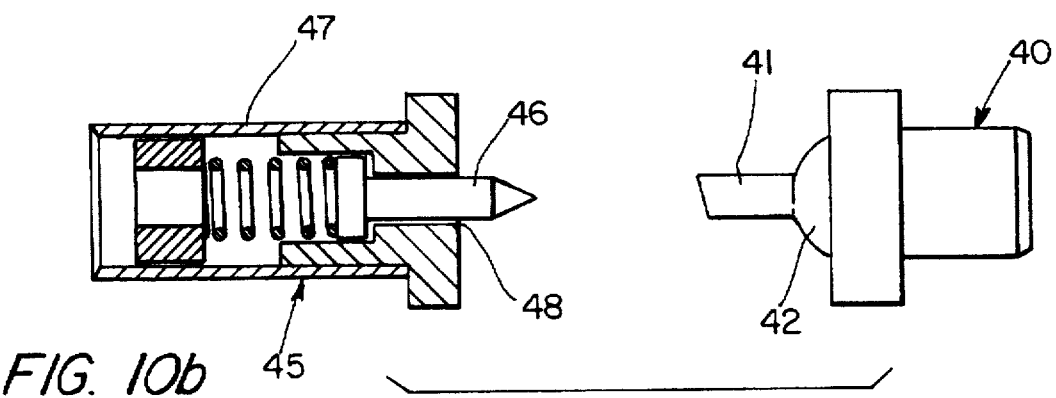
FIG. 10b
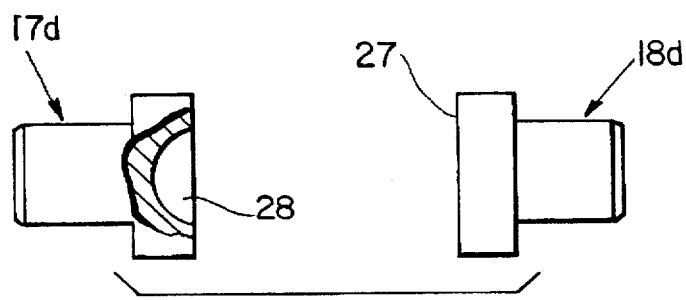
FIG. 11
FIG. 12
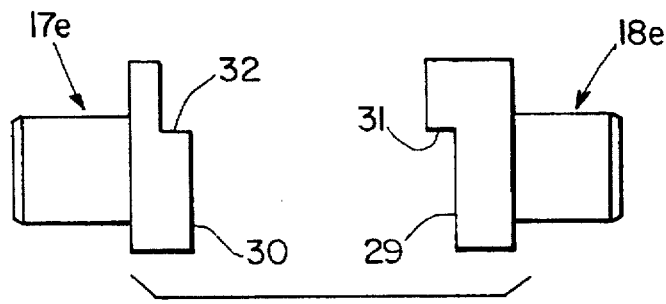

DEVICE AND PROCESS FOR REPAIRING AND CONNECTING VEHICLE BODY ELEMENTS OF A LIGHT ALLOY

DESCRIPTION

The invention relates to a device and a process for connecting stacked vehicle body elements of a light alloy, which elements are to be connected by means of riveting.

Combined joint connections are currently gaining in importance. The combinations represented by cementing and punch riveting, cementing and interlayer jointing, and cementing and conventional riveting are being used with increasing frequency for lightweight structures (cf Conference on Low-Heat Jointing Techniques—Cementing, Interlayer Jointing, Riveting, May 5–6, 1993, pages 18–19, published by the Friends of the Laboratory for Jointing Techniques of the University—GH—Paderborn e.V.). However, the conventional riveting process presents the disadvantage that a number of operations are required to produce a riveted connection. In a first operation the light alloy elements to be connected must be positioned suitably one on the other, and in a second operation a hole must be drilled through the two light alloy elements. In a third operation the holes drilled are countersunk on one side so that smooth surfaces are obtained at the junction points. Lastly, the two light alloy elements are riveted together in a fourth operation.

A transition has accordingly been made to replacement of conventional riveting processes by punch riveting processes. It is necessary in repair of body damage in particular to replace existing conventional riveting processes with a simpler and more cost-effective process.

If a vehicle with a light alloy body has suffered body damage and elements must be replaced, it is necessary to replace the stamped rivets. A grinding machine could be used to grind off the ends of the stamped rivets, and the stamped rivets could then be knocked out. Another theoretical possibility is that of drilling out the stamped rivets. Processes such as this customary in separation of steel plates held together by riveting cannot be applied for light alloy bodies, inasmuch as grinding or drilling of stamped rivets generates steel chips which result in contact corrosion.

It is the goal of the invention to develop a process and a device which simplify and ensure replacement of damaged body elements fastened to other body elements by stamped rivets and simultaneously to ensure that the danger of contact corrosion by steel chips is not present.

The process claimed for the invention presents the advantage over prior-art processes that perforation of the light alloy elements, countersinking the upper edge of the hole, and forcing the bottom edge of the hole of the top element into the other element to be connected are executed in a single operation.

The process of the present invention permits execution of repair. By application of the process of the present invention two light alloy elements connected by means of stamped rivets can be separated from each other in a simple manner and then connected again.

In the repair process the stamped rivet is forced from the undamaged body element with no chip forming deformation, so that no steel chips resulting in the contact corrosion in question can be generated. After the shape of the stamped areas produced by the stamped rivets has been restored and a new element corresponding to the element to be replaced has been matched, a hole is punched and at the same time a dimple is produced for the rivet head of the rivet jointing carried out in the next process step by means of a solid light alloy rivet, all in one operation, preferably in places at which there was a stamped rivet in the other element. The edge of the hole in the new element is simultaneously forced into the other element by this pressing operation. Consequently, a damaged body element may be removed and replaced by a new element in a few process steps, the generation of steel chips being definitely prevented.

BRIEF DESCRIPTION OF THE DRAWINGS

FIG. 10a a tool pair for punching a hole in the new element and in the other element and for producing a dimple.

FIG. 10b a tool pair for punching a hole in the light alloy elements on one side and for fixing the hole to be punched on the other side.

FIG. 11 a tool pair for compressing the light alloy rivet, and

FIG. 12 a tool pair for production of a stepped area on the new element or on another undamaged body element.

Figure 1:
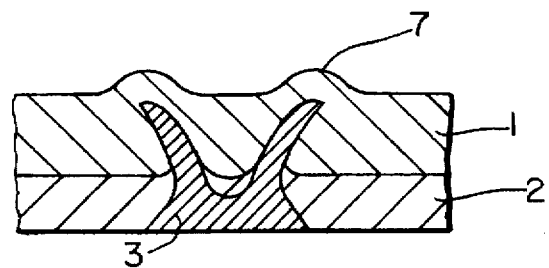
FIG. 1 shows in cross section a stamped rivet connection of two light alloy sheets.

The tool inserts of the device claimed for the invention are shown in FIG. 10a. The tool insert shown on the right is a stamping punch 18c. The stamping punch 18c has a cylindrically shaped punching element 23 and a stamping element 24 in the form of a truncated cone. The tool insert shown on the left in FIG. 10a is a pressure pad 17c intended to receive the punching element 23. The pressure pad 17c may have a countersink 26 if desired. It is claimed for the invention that the stamping punch 18c may be used to punch holes in light alloy elements by means of the punching element 23, stamp a countersink with stamping element 24, and press the lower edge of the hole in the top element into the other element in a single operation. The connecting hole produced with this device has the shape illustrated in FIG. 5.

The process for connecting light alloy elements can be executed essentially in two process steps by means of the tool inserts shown in FIG. 10a.

Figure 2A:
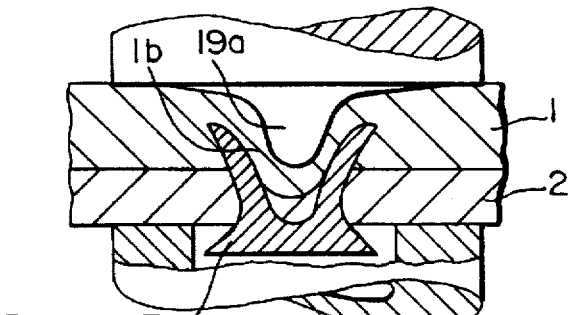
FIGS. 2a, 2b, 3–6 the individual process steps from removal of the stamped rivet to connecting of a new dement with the undamaged element by means of a light metal alloy rivet.
Figure 2B:
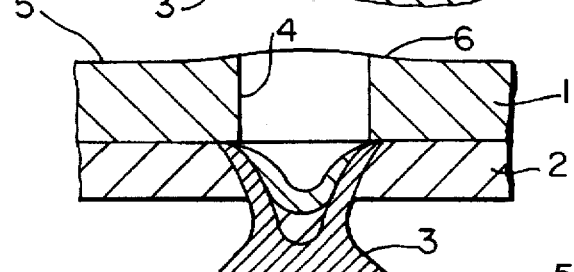
Figure 3:
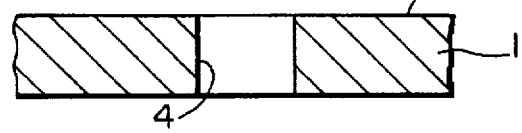
Figure 4:
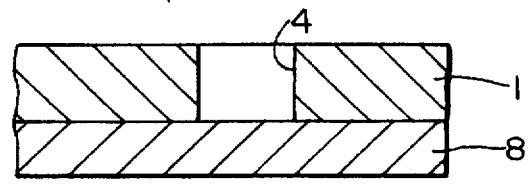

Reference is made in what follows to FIGS. 1–6. FIG. 1 shows connecting of an aluminum element 1 with a body element 2 consisting of sheet aluminum, in a joint produced with a stamped rivet 3. Assume that a body element 2 has been damaged and must be replaced by a new element. In a first process step the stamped rivet 3, as shown in FIGS. 2a and 2b, is forced out of element 1 and the body element 2, along with the stamped rivets 3, is removed. This operation is preferably performed in such a way that the stamped rivet 3 remains in the body element 2, so as to prevent individual stamped rivets from falling into cavities in the body and causing contact corrosion. Forcing the stamped rivet 3 out causes appearance in element 1 of a hole 4 which on the free top 5 of the element 1 is surrounded by a ridge 6 deriving from the stamped area 7 (FIG. 1) produced during the stamp riveting. In the next process step, shown in FIG. 3, the ridge 6 is removed so that a level surface 5 is present. As is illustrated in FIG. 4, a new element 8 replacing the damaged body element 2 is adapted to the element 1 add, in a single operation, a hole 9 aligned with hole 4 is punched in the new element 8, a countersink 10 is stamped on the outside of the new element 8, the edge 9a of the hole 9 being forced into the element 1, and the hole 4 in element 1 is enlarged to become hole 4a. This results in appearance of a bead 1a on the outside of element 1. In the last process step, illustrated in FIG. 6, the element 1 and the new element 8 are connnected in the conventional manner by means of a solid light alloy rivet 11. In the process the bead 1a is reshaped and seals the rivet 11 in the hole 4a. Because of its lower strength, this rivet, which consists of AlMgSi, for example, must be larger in diameter than stamped rivet 3.

Figure 7:
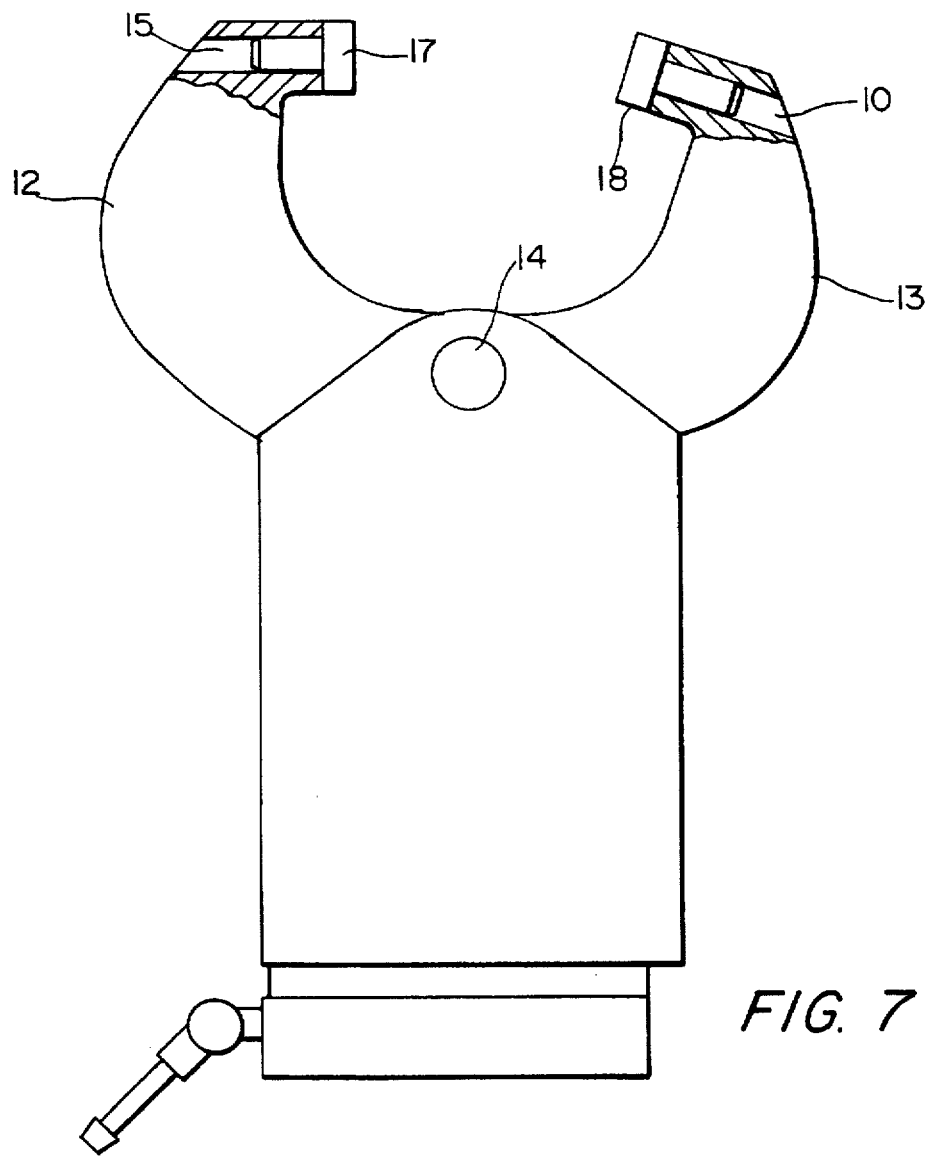
FIG. 7 a diagrammatic representation of a compressed air riveting press suitable for application of the process claimed for the invention.

FIG. 7 shows a device for execution of the process steps described in the foregoing. It has two pneumatically compressible tong arms 12 and 13, of which tong arm 12 is stationary and tong arm 13 is rotatable about a pivot 14 toward the first tong arm 12. The tong arms 12, 13 have in their ends drilled holes 15, 16 to receive replaceable tool inserts 17 and 18 and form a tool pair operating in conjunction with each other, one of which is a stamp and the other a pressure pad.

Figure 8:
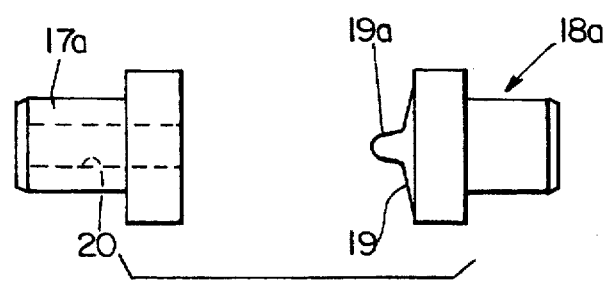
FIG. 8 a tool pair for removal of a stamped rivet.

In order to force out the stamped rivet as shown in FIGS. 2a and 2b use is made of the tool pair shown in FIG. 8, whose stamp 18a has a flat, tapering surface 19 with an angle of taper, con. of approximately 5° and a tapering rounded tip 19a, and whose pressure pad 17a is provided with a drilled hole 20 whose diameter is slightly larger than that of the stamped rivet 3 (FIG. 2a). The tapering tip 19a compresses the material 1b of element 1 in the center of stamped rivet 3 and, as is illustrated in FIG. 2a, dislodges it from element 1. The material 1a is highly compressed by the rounded tip 19a, but no excessive transverse load is applied to the rivet which might result in bursting of the rivet and could cause elements of the rivet to remain in the hole 4a and generate contact corrosion. As is to be seen from FIG. 2a, the tapering tip 19a has a shape matching that of the interior space of the stamped rivet and a volume amounting to about two-thirds of the volume of this interior space.

Figure 9:
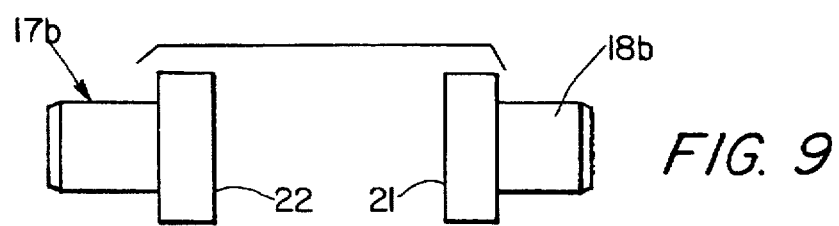
FIG. 9 a tool pair for restoration of the shape of the stamped area left by the stamped rivet on the other, undamaged, element.

In order to carry out the process step described in connection with FIG. 3 use is made of the tool pair shown in FIG. 9, whose stamp 18b and pressure pad 17b have opposing faces and thus effect restoration of the shape of ridge 6 (FIG. 2b).

Figure 5:
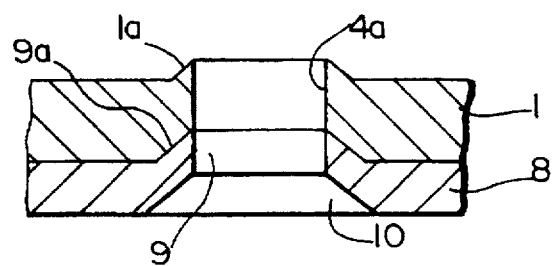

The tool pair shown in FIG. 10a is used to carry out the process step described in connection with FIG. 5. The stamp 18c is provided with a punching element 23 which produces holes 4a and 9. There is also provided a stamping element 24 which shapes the countersink 10 for the head of the rivet subsequently used to connect elements 1 and 8 and which forces the edge 9a of hole 9 into element 1. The pressure pad 17c has a drilled hole 25 in which punching element 23 is embedded after punching has been completed, and also, if required, a countersink 26 by means of which the bead 1a around hole 4a in element 1 is leveled (FIG. 5).

The tool pair shown in FIG. 10b is also used to carry out the process step described with reference to FIG. 5. The tool insert shown on the right is a stamp 40, which, like stamp 18c, has a punching element 41 and a stamping element 42. The tool insert shown on the left in FIG. 10b is a pressure pad which differs essentially from pressure pad 17c in FIG. 10a in that a pin 46 is spring mounted in a drilled hole 48. A spring element 47 forces pin 46 forward and makes it possible for pin 46 to slide into hole 4 in the light alloy element 1 remaining on the vehicle (see FIG. 4). The sliding of the pin into hole 1 causes the position of the hole to be punched in the new elements to be fixed with precision. Transfer of the hole present in the reverse side of the connecting site to the front side of the new element is eliminated. Such transfer was effected in the past by means of a tool provided with two tips for transfer of the hole position from the rear forward.

Elimination of the transfer operation is made possible by the tool pair shown in FIG. 10b.

Figure 6:
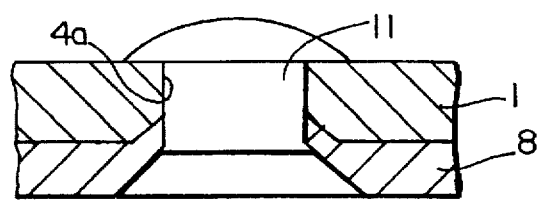

The tool pair shown in FIG. 11 is used to produce the riveted joint shown in FIG. 6, the stamp 18d having an even frontal surface 27 which comes to rest on the even head of the rivet 11, while the pressure pad 17d his in its opposite frontal surface an indentation 28 serving the purpose of shaping the rivet head on the other end of the rivet. The frontal surface of the pressure pad eliminates the bead 1a (FIG. 5), as a result of which the rivet is sealed in hole 4a.

In many instances it is necessary to provide the new element 8 or even element 1 with a stepped area only if the edges of these elements are stacked, but the surfaces of the elements must be in alignment. The device illustrated in FIG. 7 may be used to produce such a stepped area, by means of the tool pair shown in FIG. 12, whose frontal surfaces 29 and 30 are provided with matching stepped areas 31, 32 used in conjunction with each other.

Elements 1 and 2 are also generally bonded by a bonding agent in addition to the connecting by punch riveting. This bonding agent is released under pressure when the stamped rivet as shown in FIG. 2a is forced out, at least in this area. In other places release of the bonding agent could be effected by compression of the elements by means of the tool pair shown in FIG. 9.

In order to accelerate tool replacement, all or some of stamps 18a to 18e may be distributed over the circumference in a first rotatable toolholder or all or some of pressure pads 17a to 17e over the circumference in a second rotatable toolholder and all or some of pressure pads 17a to 17e may be distributed over the circumference in a second rotatable toolholder mounted rotatably on tong arm 12 or 13.

It should be pointed out that process steps (d) and (e) illustrated in FIGS. 5 and 6 and the corresponding tool pairs shown in FIGS. 10 and 11 may also be used to connect new light alloy elements.

I claim:

1. A process for repairing vehicle bodies having first and second stacked elements which are connected to each other by rivets, comprising:

forcing out, from said first element only, at least one rivet connecting said first and second elements and removing said second element, with said at least one rivet attached, from said first element;

restoring a stamped area on said first element, which stamped area resulted from riveting of said first and second elements;

placing a third element in position to be connected to said first element;

in a single operation, punching a hole through said first and third elements and stamping a countersink in a top edge of said third element and forcing a portion of a bottom edge of said third element in the vicinity of said countersink into said first element; and extending a rivet through said punched hole in said first and third elements to connect said third element to said first element.

2. A process as in claim 1 further including the step of applying a bonding agent to at least one of said first and third elements prior to said single operation of punching and stamping.

3. A device for repairing vehicle bodies having first and second stacked elements which are connected to each other by at least one rivet having a diameter, and a third element for replacing said second element, comprising:

two pneumatically compressible tong arms (12, 13) for holding replaceable tool inserts (17, 18);

a first stamp tool insert (18a) having a tapering tip (19a, 19) and a first pressure pad tool insert (17a) having a hole (20) with a diameter substantially corresponding to said rivet diameter, whereby when said first stamp tool insert is held in one of said arms and said first pressure pad tool insert is held in another of said arms, said tapering tip is operable to force out, from said first element only, said at least one rivet into said hole in said first pressure pad tool insert;

a second stamp tool insert (18b) having an even stamp surface (21) and a second pressure pad tool insert (17b) having an even pad surface, whereby when said second stamp tool insert is held in one of said arms and said second pressure pad tool insert is held in another of said arms, said even stamp surface and even pad surface are operable to restore a stamped area on said first element, which stamped area resulted from riveting said first and second elements;

a third stamp tool insert (18c) having a punching member (23) and a stamping member (24) and a third pressure pad tool insert (17c) having a hole (25), whereby when said third stamp tool insert is held in one of said arms and said third pressure pad tool insert is held in another of said arms, said punching member is operable to punch a hole through said third element and said stamping member is operable to stamp a countersink in said third element, which countersink extends into said first element.

4. A device as in claim 3 including a fourth stamp tool insert (18d) having an even stamp surface (27) and a fourth pressure pad tool insert (17d) having an indentation (28), whereby when said fourth stamp tool insert is held in one of said arms and said fourth pressure pad tool insert is held in another of said arms, said even stamp surface (27) and said indentation are operable to produce a riveted joint connecting said first and third elements.

5. A device as in claim 3 wherein said at least one rivet encompasses an interior space and said tapering tip (19a, 19) of said first stamp tool insert (18a) has a shape substantially matching said interior space and has a volume of about two-thirds of the volume of said interior space.

6. A device as in claim 3 including a fifth pressure pad tool insert (45) including a pin (46) and a spring (47) for forcing said pin into a hole in said first element to align said device with said first element.

7. A device as in claim 3 wherein said third pressure pad tool insert (17c) includes a countersink surrounding said hole (25).

8. A device as in claim 3 wherein said tapering tip (19a, 19) includes a rounded tip (19a) and a tapering surface (19) extending to said rounded tip (19a).

9. A device as in claim 8 wherein said tapering surface has an angle of taper of approximately 5° to 7°.

10. A device as in claim 3 including a sixth stamp tool insert (18e) having a stepped frontal surface (29, 31) and a sixth pressure pad tool insert (17e) having a matching stepped frontal surface (30, 32) for producing a stepped area in said first and third elements when connected.

11. A device as in claim 3 further including a first toolholder rotatively mounted on one of said tong arms for holding a plurality of said tool inserts and a second toolholder rotatively mounted on another of said tong arms for holding a plurality of said tool inserts.

* * * * *